United States Patent [19]

Winter

[11] Patent Number: 4,516,988
[45] Date of Patent: May 14, 1985

[54] METHOD AND APPARATUS FOR PURIFYING A GAS STREAM IN A SORPTION FILTER

[75] Inventor: Karl Winter, Dortmund, Fed. Rep. of Germany

[73] Assignee: Rekuperator KG Dr.-Ing. Schack & Co., Düsseldorf, Fed. Rep. of Germany

[21] Appl. No.: 526,557

[22] Filed: Aug. 25, 1983

[51] Int. Cl.$^3$ ............................................. B01D 53/04
[52] U.S. Cl. ............................................. 55/59; 55/74; 55/179; 55/208; 55/387
[58] Field of Search ............... 55/20, 21, 25, 26, 59, 55/61, 62, 74, 160–163, 179, 180, 198, 208, 387

[56] References Cited

U.S. PATENT DOCUMENTS

| 1,533,716 | 4/1925 | Voress et al. | 55/59 |
| 1,616,242 | 2/1927 | Voress et al. | 55/59 |
| 2,247,594 | 7/1941 | Bayerl | 55/59 |
| 2,880,818 | 4/1959 | Dow | 55/62 |
| 3,534,529 | 10/1970 | Mattia | 55/62 |
| 4,190,423 | 2/1980 | Winter | 55/62 X |
| 4,414,003 | 11/1983 | Blaudszun | 55/59 X |
| 4,421,532 | 12/1983 | Sacchetti et al. | 55/59 X |
| 4,436,534 | 3/1984 | Seguy | 55/59 X |
| 4,440,549 | 4/1984 | Girard et al. | 55/59 |

FOREIGN PATENT DOCUMENTS 3020656 12/1981 Fed. Rep. of Germany .

Primary Examiner—Robert Spitzer
Attorney, Agent, or Firm—Herbert L. Lerner; Laurence A. Greenberg

[57] ABSTRACT

Method for the purification of a gas stream loaded with organic gases or vapors, especially up to near the saturation limit, in a sorption filter, in which the gas stream loaded with organic gases or vapors is mixed with a gas conducted in a loop, and together with the latter is conducted through the sorption medium layer of the sorption filter, the volumetric flow of the circulating gas being larger than the volumetric flow of the gas to be purified. After the mixed gas stream is conducted through the sorption medium layer, a partial stream of the now purified gas is branched off and removed, where the volumetric flow of the branched-off gas corresponds to the volumetric flow of the gas to be purified and where the remainder of the purified gas is returned to the mixing point as circulating gas and is mixed there again with the gas to be purified.

14 Claims, 1 Drawing Figure

U.S. Patent May 14, 1985 4,516,988
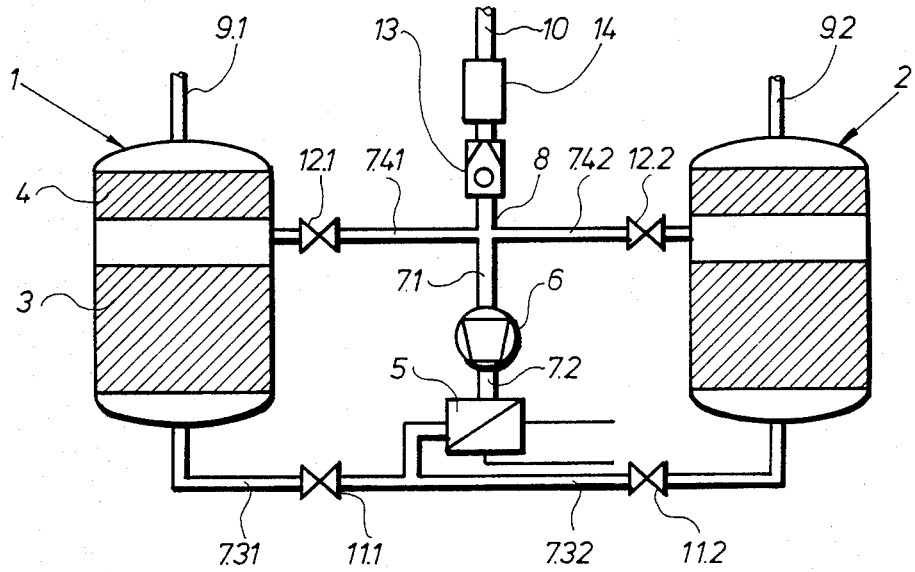

4,516,988

METHOD AND APPARATUS FOR PURIFYING A GAS STREAM IN A SORPTION FILTER

BACKGROUND OF THE INVENTION

1. Field of the Invention

The invention relates to a method for purifying a gas stream loaded with organic gases or vapors especially to near the saturation limit in a sorption filter, as well as to an arrangement for carrying out this method.

2. Description of the Prior Art

In gas-purifying technology, vaporous organic substances are separated in many cases from the gas stream to be purified by adsorption in a sorption medium, preferably activated carbon. For this purpose, the gas stream is conducted through a layer of granular sorption medium and during its travel through the layer turbulence and diffusion transport the molecules to be separated into the activated carbon, where they are retained by adsorption and capillary condensation. In the process, adsorption heat is released, which heats up the sorption medium and the gas stream to be purified. This temperature rise which is substantially determined only by the concentration, reaches such values at high concentrations of the substances to be separated that the separation is impeded thereby because the attainable equilibrium loadings drop with increasing temperature. Thereby, the concentrations of organic impurities in the gas subjected to purification in the sorption medium remain relatively high. In addition, the danger of ignition or more generally, the danger of undesired chemical reactions is increased by the temperature rise. In order to decrease the temperature rise, an amount of atmospheric air is frequently admixed to the gas stream to be purified to reduce the concentration of the substances to be separated to desirable low values before entering the sorption medium bed. However, with the increase of the gas stream to be purified, the power requirements of the blowers and in many cases also the size of the sorption filters increase. In particular, however, the product of the emission from the sorption filter has a concentration and a gas flow which remains high even though the concentration is lowered by addition of air, because the gas stream is increased at the same time.

German Published Non-Prosecuted Application No. DE-OS No. 30 20 656 attempts to avoid these disadvantages by two measures: Instead of one activated-carbon bed, several are connected in series, and the gas stream to be purified is always conducted over a cooler between two beds and thereby cooled. Through these intermediate cooling operations, it is possible to remove the adsorption heat. A still present high concentration of organic substances in the gas can be eliminated by post-combustion according to the proposal of DE-OS No. 30 20 656. In order to obtain, according to this proposal, the desired or required low emission values, an elaborate structure of the sorption filter with intermediate coolers inserted between a multiplicity of sorption medium stages and optionally, additional post-combustion may be necessary. Thus, not only must the equipment expense be taken into account but the power consumption for the intermediate cooling and maintenance of the post-combustion must also be taken into consideration.

SUMMARY OF THE INVENTION

An object of the invention is to provide a simple and efficient method and an arrangement by means of which a gas stream can be purified to obtain and maintain the desired or specified emission values.

With the foregoing and other objects in view, there is provided in accordance with the invention a method for the purification of a gas stream loaded with organic gases or vapors, especially up to near the saturation limit, in a sorption filter, which comprises circulating a gas in a loop through a sorption medium layer, introducing a gas stream containing organic impurities into the circulating gas stream at a point in the loop prior to passage through the sorption medium layer, maintaining a volumetric flow of the circulating gas which is larger than the volumetric flow of the gas to be purified introduced into the circulating gas stream, passing the mixture of circulating gas and gas containing organic impurities through the sorption medium layer to remove organic impurities, withdrawing a portion of said purified mixture of gases after passage through the sorption medium layer, maintaining a volumetric flow of said portion of gases which substantially corresponds to the volumetric flow of the gas to be purified, and continuing the circulation of the remainder of the purified mixture of gases as circulating gas to the mixing point to be mixed with gas to be purified and this mixture of gases circulated to the sorption medium layer.

In accordance with the invention, there is provided an apparatus for the purification of a gas stream loaded with organic gases or vapors comprising a gas loop with a circulatory blower and connecting pipes connected to a container of a sorption filter, a feedline for the gas to be purified opening into the loop on the suction side of the blower, said container of the sorption filter having at least two sorption medium layers which are separated from each other to provide a space therebetween, said loop having its return line from the container opening into said space between the two layers, and a purified gas outlet in the container above the sorption medium layer above said space for the discharge of purified gas.

Other features which are considered as characteristic for the invention are set forth in the appended claims.

Although the invention is illustrated and described herein as embodied in a method and apparatus for purifying a gas stream in a sorption filter, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying the method of the operation. Gas is circulated in a loop by a blower, through a cooler into a sorption filter, through a sorption medium layer therein, then out of the filter back to the blower. Gas to be purified is introduced into the loop at the suction side of the blower in a volumetric flow less than the circulating gas and the mixture recirculated. A portion of the purified gas in a volumetric flow substantially equal to the feed-in of gas to be purified passes from the top of the sorption medium layer to another sorption medium layer spaced above it and is then discharged from the sorption filter. The remainder of the purified gas is recirculated for further mixing with gas to be purified and this mixture sent by the blower to the sorption filter.

DETAILED DESCRIPTION OF THE INVENTION

In the purification of a gas stream loaded with organic gases or vapors, especially up to near the saturation limit, in sorption filters, adsorption heat is released which depends on the concentration of the substances to be separated and can heat the sorption media and the gas stream to be purified until the separation is impeded. To reduce the temperature increase, the gas stream to be purified is mixed with circulating gas and is conducted, together with the latter, through the sorption medium layer of the sorption filter, where the volumetric flow of the circulating gas exceeds the volumetric flow of the gas to be purified. The circulating gas can be cooled in the process and a sorptive post-purification of the basically purified gas which flows out of the loop can be provided. The apparatus for carrying out the method contains a gas loop with a circulating blower and connecting pipelines, which is connected to the container of the sorption filter. The gas to be purified is fed via the feedline into the loop in the vicinity of the line on the suction side. In the container of the sorption filter, separated sorption medium layers are provided arranged at a distance from each other. The loop return is connected to the space between the two layers and the purified-gas discharge to the space following the second layer.

According to the invention, the gas stream loaded with organic gases or vapors is mixed with gas conducted in a closed circuit and is conducted, together with the latter, through the sorption medium layer of the sorption filter, where the volumetric flow of the circulating gas is larger than the volumetric flow of the gas to be purified. After the mixed-gas stream is conducted through the sorption medium layer, a partial stream of the now purified gas is branched-off and discharged. The volumetric flow of the branched-off gas corresponds to the volumetric flow of the gas to be purified. The remainder of the purified gas is returned to the mixing point with incoming gas to be purified as circulating gas and is mixed there with the incoming gas to be purified. Since the concentration of the substances to be separated is reduced in the ratio of the volumetric flow of the gas to be purified to the volumetric flow of the circulating gas, and since the volumetric flow of the circulating gas is larger than the volumetric flow of the gas to be purified, the concentration of the substances to be separated is lowered to a value less than half the value of the entry concentration.

In general, a reduction by one order of magnitude is sufficient in case of very high concentrations of organic substances in gas such as occur in the displacement gas of tanks which are filled with organic substances, especially if their charge consists of highly volatile hydrocarbons. For this latter purpose, the volumetric flow of the circulating gas should desirably have a magnitude which exceeds the volumetric flow of the displacement gas to be purified by a factor of about 5 to 20.

In a further embodiment of the method, the circulating gas is cooled, preferably after flowing through the circulating blower transporting the circulating gas. Heat is thereby removed from the circulating gas beyond the heat removal by the transferred purified gas and by the surfaces of the parts of the apparatus forming the gas loop. Thereby, the dissipation heat of the circulating blower, in addition to the adsorption heat, can be compensated in a simple manner.

The partial stream of the branched-off purified gas may be conducted through a further sorption material layer before it is discharged. The gas stream fed to this further sorption medium layer has a volumetric flow which corresponds to the volumetric flow of the gas to be purified. The concentration of the substances to be separated is extremely low in the gas stream fed to the further sorption medium. The concentration in this gas stream may increase if the sorption medium layer connected into the loop has reached its breakthrough, i.e., its maximum loading. The separation in this further sorption medium layer ensures that the outflowing gas is practically free of impurities to be separated. This flow of the gas stream to the further sorption medium is maintained even if the sorption medium layer connected into the loop is loaded to maximum saturation and an increase of the substances to be separated in the circulating gas indicates that this saturation has been reached. It goes without saying that the sorption filter should be regenerated when this loading state is reached.

An arrangement for carrying out the method, according to the invention, is characterized by the features: that a gas loop with a circulating blower and connecting pipelines is connected to the container of the sorption filter, and the feed line for the gas to be purified leads into the loop in the vicinity of the line on the suction side of the circulating blower; that the container of the sorption filter has sorption medium layers which are separated from each other, the return line of the loop is connected in the region of the space between two sorption medium layers and the filter container has a connection for the purified-gas discharge line following the second sorption medium layer. In addition, the circulating blower is followed by a cooler. With this arrangement, the method can be carried out in a simple manner. The design of the circulating blower is determined here by the desired mixing ratio which is to be maintained, as well as by the pressure difference which the volumetric flow of the circulating gas must overcome. In view of the expected released adsorption heat and of the dissipation heat of the circulating blower, the surfaces of containers of the sorption filter and pipelines are designed to effect considerable heat removal. The insertion of a cooler into the loop, according to the embodiment, permits removal of heat going beyond the removal of adsorption heat as well as of dissipation heat of the blower.

In addition, a shut-off valve is provided in each of the loop lines leading to the container of the sorption filter. These shut-off valves permit one to cut off the loop from the sorption filter, for instance for the purpose of regenerating the sorption filter. The regeneration can be carried out by known means, for instance, with superheated steam or with heated inert gas, wherein the desorption medium is advantageously fed into the sorption filter through the line previously used for discharging the purified gas and the desorption medium flows through the sorption filter in a direction counter to that of the flow of the gas to be purified. The desorption medium loaded with desorbate is discharged from the line which previously fed the circulating gas into the sorption filter.

In a further embodiment, a second sorption filter is provided in which the blower can be connected alternatingly, through shut-off valves in association with the first sorption filter or the second sorption filter. In this dual arrangement it goes without saying, that other similar multiple arrangements may be employed, continuous operation may be carried out. One of the connected sorption filters can be in the operating phase "regeneration", while the other one is switched to "gas purification".

Desirably, a check valve 13 which prevents flow-back is provided in the feedline for the gas to be purified. This check valve prevents flow-back from the loop into the feed line, if an increased underpressure should occur there for whatever reason.

A further embodiment is characterized by the feature that the feedline is provided with flashback protection 14. In handling flammable vapors and gases, ignition can never be precluded with ultimate certainty. Even with supposedly well inertized adsorbers, there is always the danger that locally confined overheated "nests" are formed. Such "nests", if oxygen is present or is supplied, can be the starting point of fires, the flashing-back of which via the connected gas feedline is prevented by the flashback protection.

The drawing shows a schematic flow diagram for an installation with two sorption filters 1 and 2. The air stream to be purified, generally tank exhaust air loaded with organic impurities is conducted via the connecting line 10 to a mixing point 8 located on the suction side of a circulating blower 6 and is mixed there into the circulating-air stream conducted through lines 7.41. The line 7.41 connects at the mixing point with the line 7.1 going to the blower 6. The blower 6 is connected via the line 7.2 to the cooler 5, the outlet of which leads to the two lines 7.31 and 7.32. Line 7.31 and line 7.32, lead to respective sorption filters 1 and 2, and lines 7.31 and line 7.32 have respective shut-off valves 11.1 and 11.2 to permit feeding the air to only one of the two sorption filters. The circulation flow goes through the sorption medium layer 3 of the sorption filter 1 put in operation and leaves the sorption filter 1 through open valve 12.1 and line 7.41, back to the mixing point 8. Similarly, if the sorption filter 2 is inserted into the loop by closing valves 11.1 and 12.1 and opening the valves 11.2 and 12.2, the circulating gas is conducted through open valve 12.2 and line 7.42 back to the mixing point 8. A second sorption medium layer 4 in the sorption filter 1 can take up residual traces of impurities which have possibly not been separated in the sorption medium layer 3 and the so purified gas, the volumetric flow of which corresponds to the volumetric flow of the gas to be purified, leaves the system through the connection stub 9.1. As a balanced system, only as much gas is discharged through the stubs 9.1 and 9.2 as is fed into the system through the feedline 10. ("Breathing" of the loop due to temperature changes is ignored here)

The following example illustrates the present invention:

During filling a storage tank with benzene, maximally 300 m$^3$/h of "displacement air" are discharged from the tank. This discharged air contains 330 g/m$^3$ gaseous benzene according to the saturation concentration at ambient temperature. This gas stream (displacement air) is to be purified to reduce the residual concentration of benzene vapor to a value below the existing limit of 20 mg/m$^3$. This is accomplished by the method and plant in accordance with the drawing. Two adsorbers 1 and 2 alternatingly take over the purification of the "displacement air". While the one is switched to "purification", the other one is regenerated in known manner with steam or with inert gas. The sorption medium layers 3 of the two adsorbers 1 and 2 which purify the circulating gas each contains 2,000 kg activated carbon and the safety layers 4 purifying the outflowing pure gas contain 1,000 kg activated carbon each. The blower 6 transports a circulating flow of 5,000 m$^3$/h, to which the "displacement air" of maximally 300 m$^3$/h is admixed. The water-cooled gas cooler 5 generates a temperature difference in the circulating gas of 2 to 8K which is sufficient to remove the adsorption heat of the benzene released in the adsorbing sorption medium layer and the dissipation loss of the blower. The loading process of the sorption filter switched to adsorption is terminated if the benzene concentration in the returning circulating gas has reached approximately 2 g/m$^3$. At this point in time, the benzene concentration after the sorption medium layer acting as the safety filter 4 is actually still below 1 mg/m$^3$. This is more than one order of magnitude less than the limit of 20 mg/m$^3$.

The foregoing is a description corresponding, in substance, to German application No. P 32 32 138.4, dated Aug. 28, 1982, international priority of which is being claimed for the instant application, and which is hereby made part of this application. Any material discrepancies between the foregoing specification and the specification of the aforementioned corresponding German application are to be resolved in favor of the latter.

I claim:

1. Method for the purification by adsorption in a sorption medium of a gas stream loaded with organic gases or vapors, especially up to near the saturation limit, in a sorption filter, which comprises circulating a gas in a loop through a sorption medium layer, introducing a gas stream to be purified containing organic impurities from a source outside of the loop into the circulating gas stream at a point in the loop prior to passage through the sorption medium layer, maintaining a volumetric flow of the circulating gas which is larger than the volumetric flow of the gas to be purified introduced into the circulating gas stream passing the mixture of circulating gas and gas containing organic impurities through the sorption medium layer to remove organic impurities, withdrawing a portion of said purified mixture of gases after passage through the sorption medium layer, maintaining a volumetric flow of said portion of gases which substantially corresponds to the volumetric flow of the gas to be purified, and continuing the circulation of the remainder of the purified mixture of gases as circulating gas to the mixing point to be mixed with gas to be purified and circulating this mixture of gases to the sorption medium layer.

2. Method according to claim 1, wherein the circulating gas is cooled to effect removal of adsorption heat.

3. Method according to claim 2, wherein cooling is effected after the circulating gas flows through a circulating blower in the loop which transports the circulating gas.

4. Method according to claim 2, wherein the withdrawn portion of purified gas is conducted through a further sorption medium layer before it is discharged.

5. Method according to claim 1, wherein the withdrawn portion of purified gas is conducted through a further sorption medium layer before it is discharged.

6. Method according to claim 5, wherein the volumetric flow of the circulating gas exceeds the volumetric flow of the gas to be purified introduced into the circulating gas stream by a factor of about 5 to 20.

7. Method according to claim 1, wherein the volumetric flow of the circulating gas exceeds the volumetric flow of the gas to be purified introduced into the circulating gas stream by a factor of about 5 to 20.

8. Apparatus for the purification of a gas stream loaded with organic gases or vapors comprising a gas loop with a circulatory blower and connecting pipes connected to a container of a sorption filter, a feedline for the gas to be purified opening into the loop on the suction side of the blower, said container of the sorption filter having at least two sorption medium layers which are separated from each other to provide a space therebetween said loop having its return line from the container opening into said space between the two layers, and a purified gas outlet in the container above the sorption medium layer above said space for the discharge of purified gas.

9. Apparatus according to claim 8, wherein the circulating blower is followed by a cooler.

10. Apparatus according to claim 9, wherein in each of the loop lines leading to and from the container of the sorption filter a valve for shutting-off the flow of gas through the loop lines is provided.

11. Apparatus according to claim 1, wherein in each of the loop lines leading to and from the container of the sorption filter a valve for shutting-off the flow of gas through the loop lines is provided.

12. Apparatus according to claim 11, wherein a second sorption filter is provided, wherein the blower can be connected alternatingly to the first sorption filter and to the second sorption filter by means of shut-off valves in inlet and outlet loop lines which are associated in pairs with each sorption filter and can be actuated in pairs.

13. Apparatus according to claim 8, wherein a check valve which prevents backward flow is inserted in the feedline for the gas to be purified.

14. Apparatus according to claim 8, wherein the feedline is equipped with flame flashback protection.

* * * * *